US009350876B2

(12) United States Patent
Riley et al.

(10) Patent No.: US 9,350,876 B2
(45) Date of Patent: May 24, 2016

(54) METHODS, SYSTEMS, AND COMPUTER READABLE MEDIA FOR DETECTING INITIATION OF A SERVICE DATA FLOW USING A GX RULE (75) Inventors: Yusun Kim Riley, Weston, MA (US); Uri Baniel, Buffalo Grove, IL (US)

(73) Assignee: TEKELEC, INC., Morrisville, NC (US)

( * ) Notice: Subject to any disclaimer, the term of this patent is extended or adjusted under 35 U.S.C. 154(b) by 1218 days.

(21) Appl. No.: 12/974,892

(22) Filed: Dec. 21, 2010

(65) Prior Publication Data
US 2011/0167150 A1    Jul. 7, 2011

Related U.S. Application Data (60) Provisional application No. 61/292,064, filed on Jan. 4, 2010.

(51) Int. Cl.
*G06F 15/173* (2006.01)
*H04M 15/00* (2006.01)
*H04L 12/14* (2006.01)
*H04W 4/24* (2009.01)
*H04L 29/08* (2006.01)

(52) U.S. Cl.
CPC ........... *H04M 15/00* (2013.01); *H04L 12/1407* (2013.01); *H04L 67/14* (2013.01); *H04M 15/66* (2013.01); *H04W 4/24* (2013.01)

(58) Field of Classification Search
CPC . H04L 65/1016; H04L 12/1403; H04L 12/14; H04L 43/028; H04L 43/18
USPC .......................................... 709/224, 234, 236
See application file for complete search history.

(56) References Cited

U.S. PATENT DOCUMENTS

| | | | | |
|---|---|---|---|---|
| 7,948,952 | B2 * | 5/2011 | Hurtta et al. ................... | 370/338 |
| 8,218,459 | B1 * | 7/2012 | Stucker ............... | H04L 63/0407 370/261 |
| 8,489,096 | B2 * | 7/2013 | Rasanen ....................... | 455/436 |
| 2004/0085942 | A1 * | 5/2004 | Le et al. ......................... | 370/338 |
| 2007/0165630 | A1 * | 7/2007 | Rasanen et al. ............... | 370/389 |
| 2007/0232301 | A1 * | 10/2007 | Kueh ............................ | 455/433 |
| 2007/0281699 | A1 * | 12/2007 | Rasanen ....................... | 455/436 |
| 2008/0046963 | A1 * | 2/2008 | Grayson et al. ................... | 726/1 |

(Continued)

FOREIGN PATENT DOCUMENTS

EP        2 107 728 A1    10/2009

OTHER PUBLICATIONS

Notification of Transmittal of the International Search Report and the Written Opinion of the International Searching Authority, or the Declaration for International Patent Application No. PCT/US2010/061932 (Sep. 27, 2011).

(Continued)

*Primary Examiner* — Dhairya A Patel
(74) *Attorney, Agent, or Firm* — Jenkins, Wilson, Taylor & Hunt, P.A.

(57) ABSTRACT

Methods, systems, and computer readable media for detecting a service data flow using a Gx rule are disclosed. According to one method, a policy and charging rules function (PCRF) node sends to a policy and charging enforcement function (PCEF) node, a Gx rule for triggering the PCEF node to generate a notification message upon initiation of a service data flow. The PCEF node receives and installs the Gx rule and uses the Gx rule to detect and report initiation of a service data flow.

17 Claims, 9 Drawing Sheets (56) References Cited

U.S. PATENT DOCUMENTS

| | | | | |
|---|---|---|---|---|
| 2008/0229385 | A1* | 9/2008 | Feder | H04L 12/14 726/1 |
| 2008/0253368 | A1* | 10/2008 | Rasanen | H04L 65/607 370/389 |
| 2008/0256251 | A1* | 10/2008 | Huotari | H04L 67/16 709/229 |
| 2009/0141625 | A1* | 6/2009 | Ghai et al. | 370/230 |
| 2009/0307746 | A1 | 12/2009 | Di et al. | |
| 2010/0039941 | A1* | 2/2010 | Tan | H04L 12/14 370/241 |
| 2010/0043053 | A1 | 2/2010 | Wei et al. | |
| 2010/0329129 | A1* | 12/2010 | Kroselberg et al. | 370/252 |
| 2011/0167150 | A1* | 7/2011 | Riley | H04L 12/1407 709/224 |
| 2011/0191482 | A1* | 8/2011 | Przybysz et al. | 709/228 |

OTHER PUBLICATIONS

3GPP, "3rd Generation Partnership Project; Technical Specification Group Services and System Aspects; Telecommunication Management; Charging Management; Diameter Charging Applications (Release 9)," 3GPP TS 32.299 V9.4.0, pp. 1-148 (Jun. 2010).

3GPP, "3rd Generation Partnership Project; Technical Specification Group Core Network and Terminals; Policy and Charging Control (PCC) Over S9 Reference Point; Stage 3 (Release 9)," 3GPP TS 29.215 V9.3.0, pp. 1-36 (Jun. 2010).

3GPP, "Universal Mobile Telecommunications System (UMTS); LTE; 3GPP Evolved Packet System (EPS); Evolved General Packet Radio Service (GPRS) Tunneling Protocol for Control Plane (GTPv2-C); Stage 3 (3GPP TS 29.274 version 9.3.0 Release 9)," ETSI TS 129 274 V9.3.0, pp. 1-162 (Jun. 2010).

3GPP, "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).

3GPP, "3rd Generation Partnership Project; Technical Specification Group Services and System Aspects; Policy and Charging Control Architecture (release 8)," 3GPP TS 23.203 v8.9.0, pp. 1-116 (Mar. 2010).

3GPP, "3rd Generation Partnership Project; Technical Specification Group Core Network and Terminals; Policy and Charging Control over Gx Reference Point (Release 9)," 3GPP TS 29.212 V9.1.0, pp. 1-106 (Dec. 2009).

3GPP, "3rd Generation Partnership Project; Technical Specification Group Core Network and Terminals; Charging Rule Provisioning over Gx Interface (Release 6)," 3GPP TS 29.210 V6.7.0, pp. 1-21 (Dec. 2006).

Znaty, "Diameter, GPRS, (LTE + ePC = EPS), IMS, PCC and SDM," EFORT, pp. 1-229 (Part 1 of 2) (May 2010).

Znaty, "Diameter, GPRS, (LTE + ePC = EPS), IMS, PCC and SDM," EFORT, pp. 230-460 (Part 2 of 2) (May 2010).

Hakala et al., "Diameter Credit-Control Application," Network Working Group RFC 4006, pp. 1-107 (Aug. 2005).

Communication of European publication number and information on the application of Article 67(3) EPC for European Patent Application No. 10841604.1 (Oct. 17, 2012).

Letter regarding Notice Before Examination for Israeli Patent Application No. 220771 (Jan. 4, 2015).

Third Office Action for Chinese Patent Application No. 201080065185.4 (Nov. 4, 2014).

Second Office Action for Chinese Patent Application No. 201080065185.4 (Apr. 25, 2014).

First Office Action for Chinese Patent Application No. 201080065185.4 (Aug. 26, 2013).

Letter regarding Office Action for Israel Patent Application No. 220771 (May 31, 2015).

Fourth Office Action for Chinese Patent Application No. 201080065185.4 (May 18, 2015).

\* cited by examiner

METHODS, SYSTEMS, AND COMPUTER READABLE MEDIA FOR DETECTING INITIATION OF A SERVICE DATA FLOW USING A GX RULE

RELATED APPLICATIONS

This application claims the benefit of U.S. Provisional Patent Application Ser. No. 61/292,064 filed Jan. 4, 2010; the disclosure of which is incorporated herein by reference in its entirety.

TECHNICAL FIELD

The subject matter described herein relates to detecting a service data flow. More specifically, the subject matter relates to methods, systems, and computer readable media for detecting initiation of a service data flow using a Gx rule.

BACKGROUND

A Gx rule is a rule sent by a policy charging and rules function (PCRF) to a policy charging and enforcement function (PCEF) over the Gx interface and that the PCEF installs and implements on-the-fly. Gx rules direct a policy charging and enforcement function (PCEF) to take some action when particular traffic is encountered. A Gx rule is made up of three parts: the rule descriptor/name, the traffic classifier part, and the directive part. The traffic classifier part describes the traffic to which the rule pertains. The directive part tells the PCEF what action to take when the traffic described by the traffic classifier part is encountered. Based on operator policy, there are cases when the PCRF needs to direct the PCEF to report when a particular traffic for a user is encountered. However, current Gx rules are used for post-service-initiation events, such as charging and subscriber bandwidth usage management.

Accordingly, a need exists for methods, systems, and computer readable media for detecting initiation of a service data flow using a Gx rule.

SUMMARY

Methods, systems, and computer readable media for detecting a service data flow using a Gx rule are disclosed. According to one method, a policy and charging rules function (PCRF) node sends to a policy and charging enforcement function (PCEF) node, a Gx rule for triggering the PCEF node to generate a notification message upon initiation of a service data flow. The PCEF node receives and installs the Gx rule and uses the Gx rule to detect and report initiation of a service data flow.

A system for detecting a service data flow using a Gx rule is also disclosed. The system includes a policy and charging enforcement function (PCEF) node for enforcing policies. The system further includes a policy and charging rules function (PCRF) node for communicating with the PCEF node and for sending, from the PCRF node to the PCEF node, a Gx rule and for using the Gx rule to detect and report initiation of a service data flow.

As used herein, the term "node" refers to a physical computing platform including one or more processors and memory.

The subject matter described herein may be implemented in hardware in combination with software and/or firmware. As such, the terms "function" or "module" as used herein refer to hardware in combination with software and/or firmware for implementing the features described herein. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
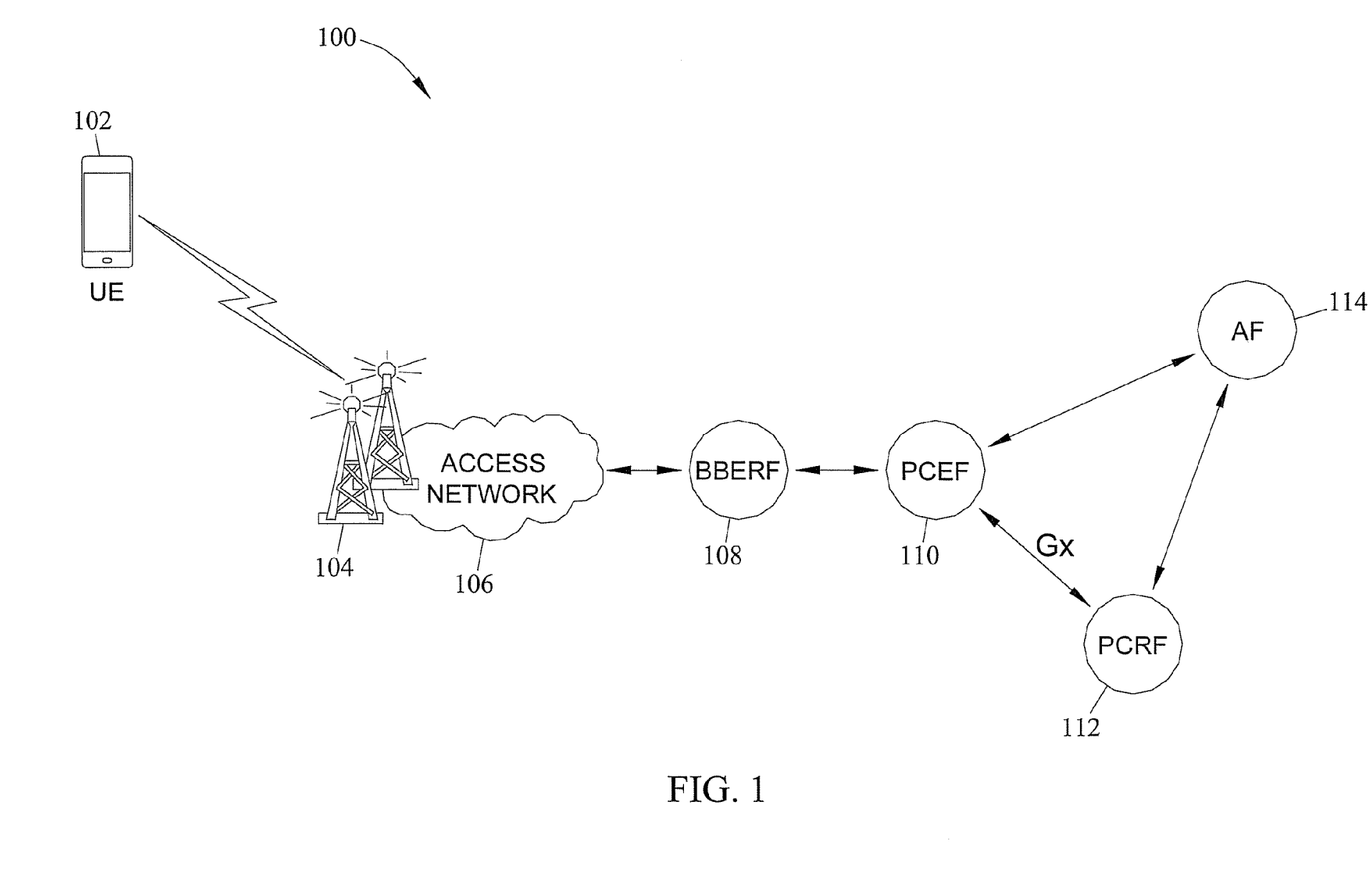
FIG. 1 is a network diagram illustrating an exemplary network for detecting an initiation of a service data flow using a Gx rule according to an embodiment of the subject matter described herein.

Methods, systems, and computer readable media for detecting initiation of a service data flow using Gx rules are provided. FIG. 1 is a network diagram illustrating an exemplary network 100 for detecting initiation of a service data flow using a Gx rule according to an embodiment of the subject matter described herein. Referring to FIG. 1, network 100 may include access network 106. Access network 106 may include nodes, functions, devices, and/or components for providing user equipment (UE) 102 access to services, functions, or devices in one or more networks. In one embodiment, access network 106 may be a radio access network (RAN). For example, access network 106 may be a global system for mobile communications (GSM) RAN (GRAN), a general packet radio service (GPRS) access network, a universal mobile telecommunications system (UMTS) RAN (UTRAN), an evolved UTRAN (eUTRAN), an Internet protocol (IP) connectivity access network (IP CAN), a code division multiple access (CDMA) network, an evolution-data optimized (EV-DO) network, a wideband CDMA (WCDMA) network, a high speed packet access (HPSA) network, an evolved HPSA (EHPSA+) network, or a long term evolution (LTE) access network. Access network 106 may include one or more transceiver nodes 104 for communicating with UE 102. UE 102 may include a computer, a pager, a mobile phone, a smartphone, a wireless modem, or other devices through which a subscriber accesses network services.

Network 100 may further include a bearer binding and event reporting function (BBERF) node 108. BBERF node 108 may be, for example, a service gateway (SGW) or a serving general packet radio service (GPRS) support node (SGSN). Network 100 may include an application function (AF) node 114. Application function node 114 may be, for example, an application server (AS), a multimedia resource function (MRF), or a proxy call session control function (P-CSCF). Network 100 includes a policy and charging enforcement function (PCEF) node 110 and a policy and charging rules function (PCRF) node 112. PCEF node 110 serves as a policy enforcement point within the network and may be placed in line between access network 106 and PCRF node 112. PCRF node 112 is a centralized node that can act as a policy decision point (PDP) for network 100. As an enforcement point, PCEF node 110 may request and receive policy rules from PCRF node 112. PCEF node 110 may receive policy rules from PCRF node 112 via, for example, the Gx interface. Policy rules may take the form of, for example, Gx rules contained in credit control messages.

As set forth above, Gx rules have been conventionally used to specify policy enforcement actions to be performed by a PCEF. A Gx rule may direct a PCEF to take particular action when certain traffic is encountered. For example, a Gx rule may direct a PCEF to adjust Quality of Service (QoS) for network traffic falling within specified parameters. A Gx rule is made up of three parts: the rule descriptor/name; the traffic classifier; and the directive. The rule descriptor/name labels the Gx rule for later identification and reference. The traffic classifier specifies the particular traffic for which the rule applies. The directive instructs the PCEF what action(s) to take when the traffic identified by the traffic classifier is encountered.

Figure 2:
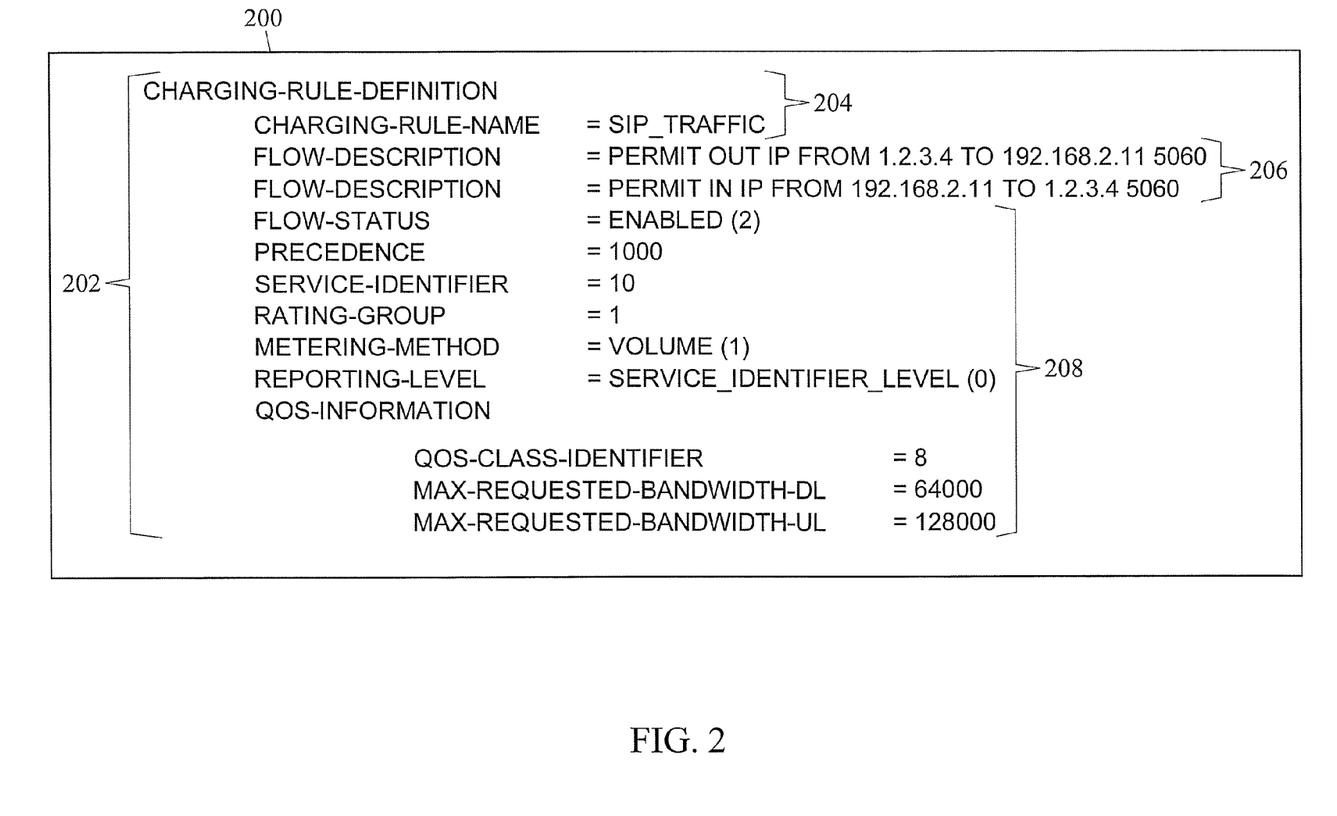
FIG. 2 illustrates a conventional Gx rule.

FIG. 2 illustrates an example of a conventional Gx rule. Referring to FIG. 2, a box 200 encloses a Gx rule 202. Gx rule 202 is made up of three parts: the rule descriptor/name 204, "SIP_traffic"; the traffic classifier 206, permitting traffic from Internet protocol (IP) address 1.2.3.4 to IP address 192.168.2.11 port 5060 to flow out and traffic from IP address 192.168.2.11 to IP address 1.2.3.4 port 5060 to flow in; and the directive 208. Directive 208 specifies that: flow status should be set at enabled(2), precedence should be set at 1000, the service identifier should be set at 10, the rating group should be set at 1, the metering method should be volume(1), and the reporting level should be set at service identifier level(0). Directive 208 also contains QoS information for instructing PCEF regarding the appropriate QoS levels for the particular traffic identified by traffic classifier 206. For example, directive 208 specifies that QoS class identifier should be set to 8, max requested bandwidth for download should be set to 64,000 bits, and max requested bandwidth for upload should bet set to 128,000 bits.

A significant limitation of a traditional Gx rule, such as Gx rule 202, is that a network operator must specify the particular action(s) to take when a service flow is detected at the time the service flow is defined. Under various scenarios, however, a network operator may be unable to make an informed decision regarding what action(s) to take with respect to a particular service flow. For example, a previously unknown application with a corresponding service flow may be requested by a subscriber. The network operator may desire to allow service flows associated with such previously unknown applications, but may also prefer to be notified of their existence in order to monitor details and network resource consumption associated with them. A Gx rule for detecting initiation of a service data flow as described by the subject matter herein provides this desired functionality.

A Gx rule for detecting initiation of a service data flow may contain a traffic classifier and a monitoring or notification directive. Such a Gx rule can be, for example, formulated by a network operator that desires to detect the existence of a particular service flow and then, subsequent to detection of the particular service flow, specify what action should be taken.

Figure 3:
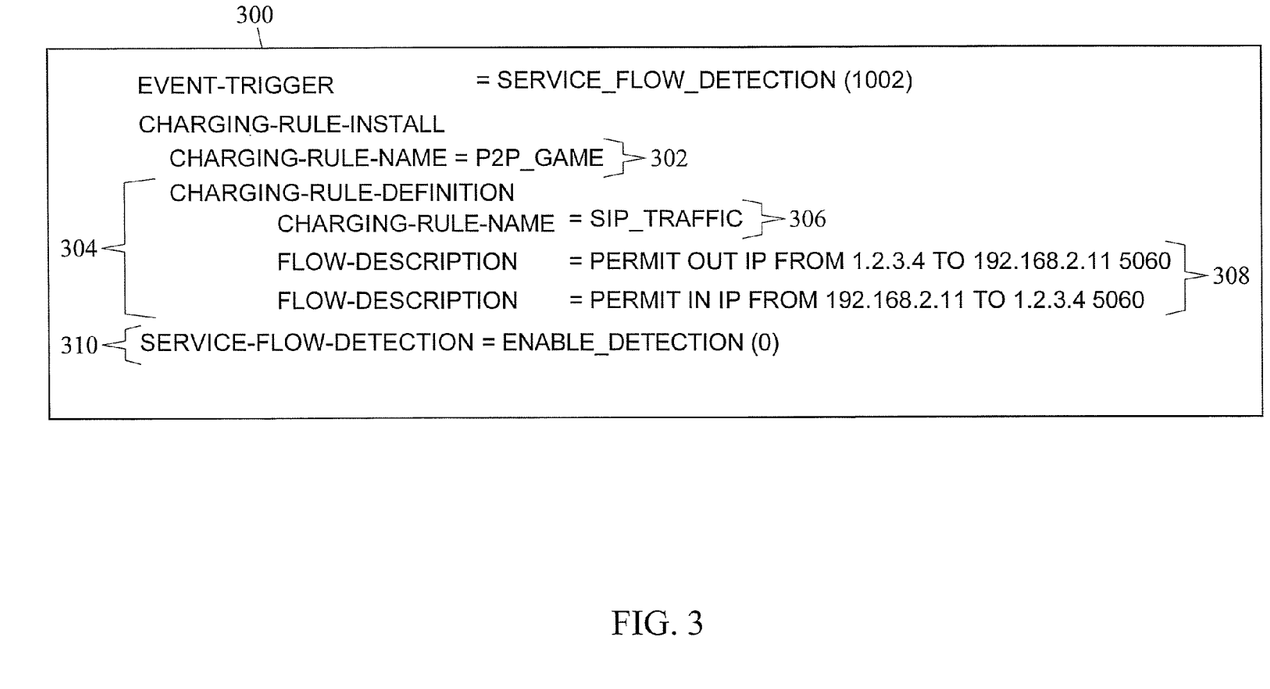
FIG. 3 illustrates an example of a Gx rule for detecting initiation of a service data flow according to an embodiment of the subject matter described herein.

FIG. 3 illustrates a Gx rule for detecting initiation of a service data flow according to an embodiment of the subject matter described herein. Referring to FIG. 3, box 300 contains two rules: a pre-defined rule 302, i.e., p2p_game, and a dynamic rule 304, i.e., SIP_traffic. Dynamic rule 304 is a Gx rule for detecting initiation of a service data flow according to an embodiment of the subject matter described herein. Dynamic rule 304 contains a rule descriptor/name 306, i.e., SIP_traffic, and a traffic classifier 308, i.e., permitting traffic from Internet protocol (IP) address 1.2.3.4 to IP address 192.168.2.11 port 5060 to flow out and traffic from IP address 192.168.2.11 to IP address 1.2.3.4 port 5060 to flow in. Dynamic rule 304, however, does not contain a directive part. Instead of a directive, portion 310 is a directive that triggers the PCEF to notify the PCRF upon detection of initiation of a service data flow matching any of the rules within the Charging-Rule-Install AVP. Directive 310 is not part of rules 302 or 306, so rules 302 and 306 can be considered null rules. However, because directive 310 is within the Charging-Rule-Install AVP, directive 310 will function as a directive for the null rules within the Charging-Rule-Install AVP. The PCEF will receive and install the rules within the Charging-Rule-Install AVP as well as the corresponding directive.

Figure 4:
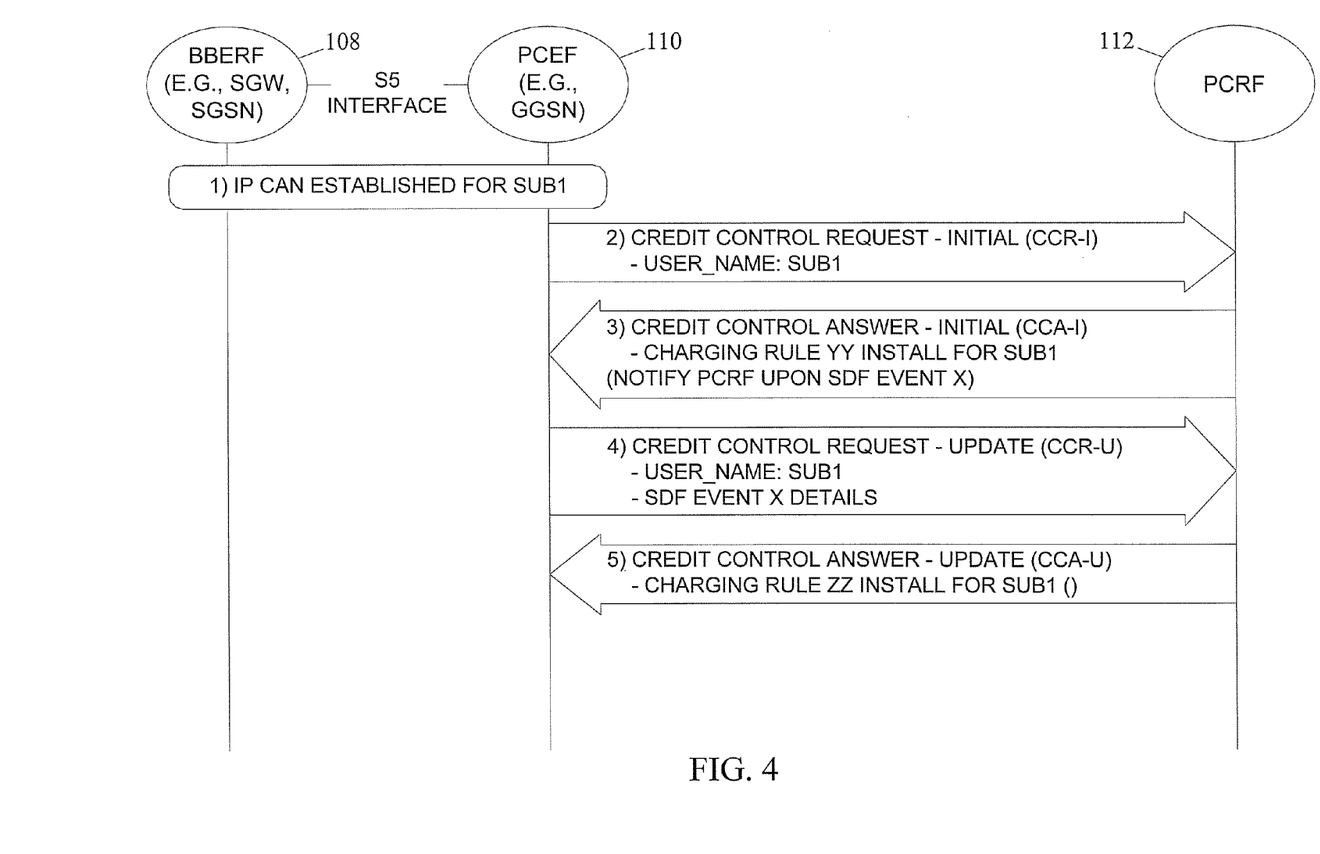
FIG. 4 is a message flow diagram illustrating the communication, installation, and operation of a Gx rule for detecting initiation of a service data flow where notification of the initiation of the service data flow is sent to a PCRF node according to an embodiment of the subject matter described herein.

FIG. 4 is a message flow diagram illustrating the communication, installation, and operation of a Gx rule for detecting initiation of a service data flow according to an embodiment of the subject matter described herein. Referring to FIG. 4, in line 1, an Internet protocol (IP) connectivity access network (CAN) session is established between bearer binding and event reporting function (BBERF) node 108 and policy and charging enforcement function (PCEF) node 110. At step 2, PCEF node 110 sends a credit control request message for subscriber 1 to policy and charging rules function (PCRF) node 112. At step 3, PCRF node 112 responds by sending a credit control answer message to PCEF node 110. The credit control answer message contains charging rule YY for subscriber 1. Charging rule YY is a Gx rule that contains a traffic classifier associated with service detection flow (SDF) event X but no corresponding directive. Charging Rule YY may further instruct PCEF node 110 that upon occurrence of SDF event X it is to notify PCRF node 112. Charging rule YY is installed on PCEF node 110 and modifies PCEF node 110 so as to notify PCRF node 112 when service detection flow event X occurs, i.e., when traffic matching the traffic classifier contained in charging rule YY is encountered. Alternatively, the Gx rule, i.e., charging rule YY, could be sent via an extensible markup language (XML) message, a simple object access protocol message (SOAP) message, or a Diameter message.

After step 3, but just prior to step 4, PCEF node 110 encounters traffic matching the traffic classifier contained in charging rule YY, i.e., service detection flow event X occurs. For example, subscriber 1 may take an action associated with the existing IP CAN session that requires transmitting or receiving traffic matching the traffic classifier contained in charging rule YY. At step 4, PCEF node 110 sends a credit control request message to PCRF node 112 notifying PCRF node 112 of the occurrence of SDF event X. The credit control request message may include information regarding the service data flow, e.g., event X details, which may be beneficial to PCRF node 112, for example, in formulating the directive part of a credit control answer message. At step 5, PCRF node 112 sends a credit control answer message to PCEF node 110 containing a new charging rule, i.e., charging rule ZZ, which may contain a directive part instructing PCEF node 110 regarding what action(s) to take with respect to the service data flow for subscriber 1.

Figure 5:
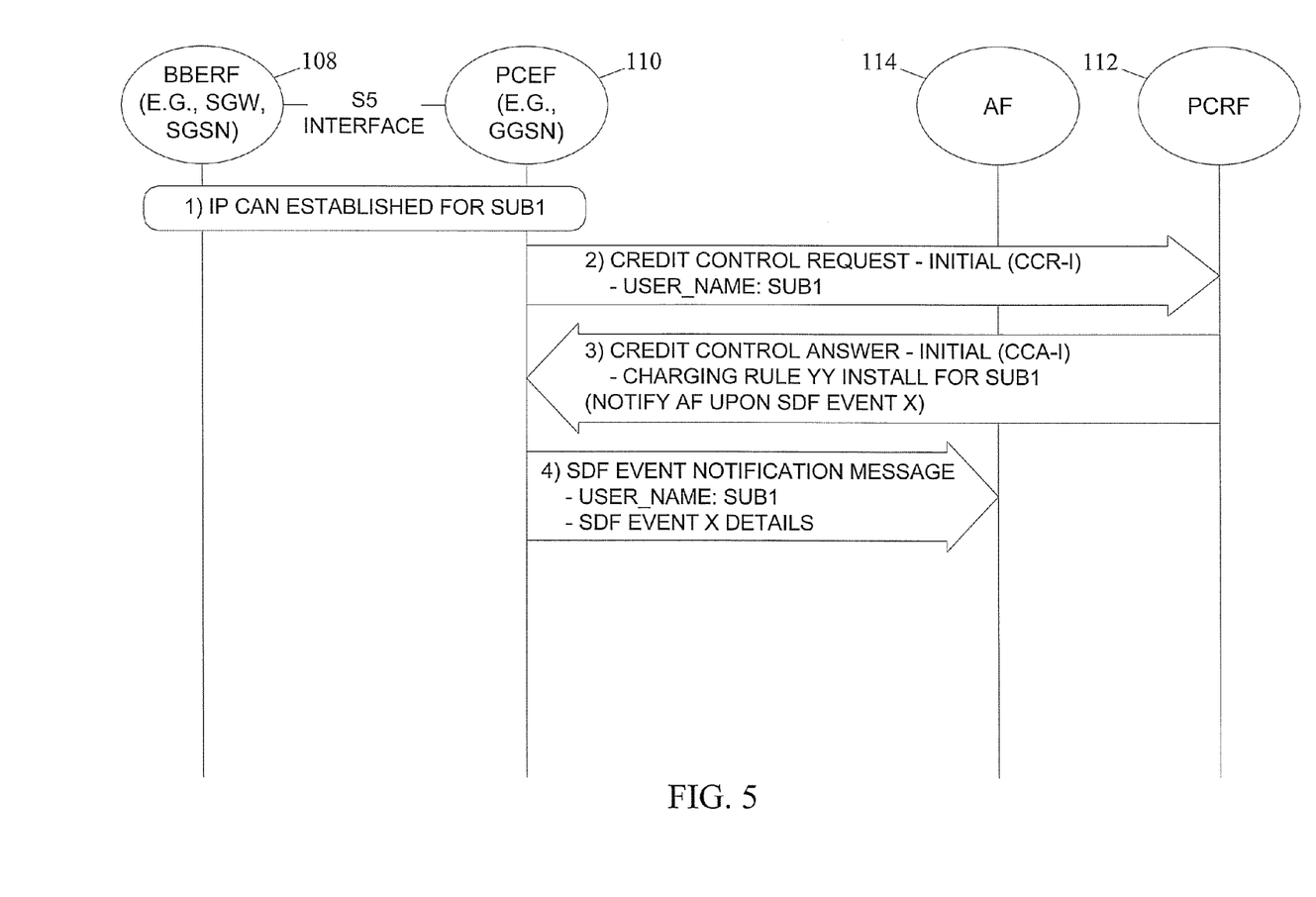
FIG. 5 is a message flow diagram illustrating the communication, installation, and operation of a Gx rule for detecting initiation of a service data flow where notification of the initiation of the service data flow is sent to an application function (AF) node according to an embodiment of the subject matter described herein.

FIG. 5 is a message flow diagram illustrating the communication, installation, and operation of a Gx rule where notification of initiation of the service data flow is sent to an AF node according to an embodiment of the subject matter described herein. Referring to FIG. 5, in line 1, an IP CAN session is established between BBERF node 108 and PCEF node 110. At step 2, PCEF node 110 sends a credit control request message for subscriber 1 to PCRF node 112. At step 3, PCRF node 112 responds by sending a credit control answer message to PCEF node 110. The credit control answer message contains charging rule YY for subscriber 1. Charging rule YY is a Gx rule that contains a traffic classifier associated with SDF event X but no corresponding directive. Charging Rule YY may further instruct PCEF node 110 that upon occurrence of SDF event X it is to notify application function (AF) node 114. Charging rule YY is installed on PCEF node 110 and modifies PCEF node 110 so as to notify AF node 114 when service detection flow event X occurs, i.e., when traffic matching the traffic classifier contained in charging rule YY is encountered. Alternatively, the Gx rule, i.e., charging rule YY, could be sent via an XML message, a SOAP message, or a Diameter message.

After step 3, but just prior to step 4, PCEF node 110 encounters traffic matching the traffic classifier contained in charging rule YY, i.e., service detection flow event X occurs. For example, subscriber 1 may take an action associated with the existing IP CAN session that requires transmitting or receiving traffic matching the traffic classifier contained in charging rule YY. At step 4, PCEF node 110 sends a credit control request message to AF node 114 notifying AF node 114 of the occurrence of SDF event X. The credit control request message may include information regarding the service data flow, e.g., event X details, which may be beneficial to AF node 114.

Figure 6:
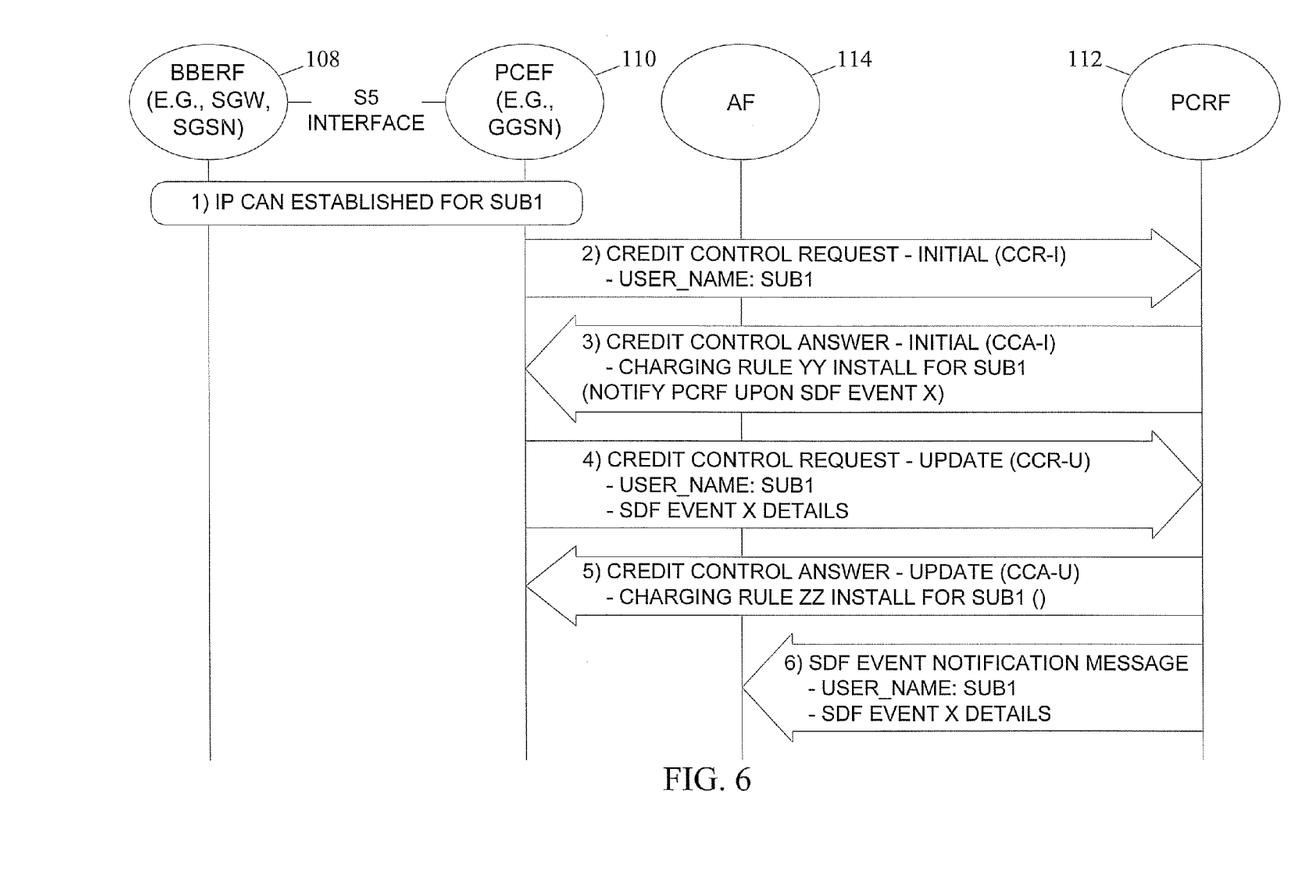
FIG. 6 is a message flow diagram illustrating the communication, installation, and operation of a Gx rule where notification of the initiation of a service data flow is sent to a PCRF node and relayed to an AF node according to an embodiment of the subject matter described herein.

FIG. 6 is a message flow diagram illustrating the communication, installation, and operation of a Gx rule where notification of initiation of a service data flow is sent to a PCRF node and relayed to an AF node according to an embodiment of the subject matter described herein. Referring to FIG. 6, in line 1, an IP CAN session is established between BBERF node 108 and PCEF node 110. At step 2, PCEF node 110 sends a credit control request message for subscriber 1 to PCRF node 112. At step 3, PCRF node 112 responds by sending a credit control answer message to PCEF node 110. The credit control answer message contains charging rule YY for subscriber 1. Charging rule YY is a Gx rule that contains a traffic classifier associated with SDF event X but no corresponding directive. Charging Rule YY may further instruct PCEF node 110 that upon occurrence of SDF event X it is to notify PCRF node 112. Charging rule YY is installed on PCEF node 110 and modifies PCEF node 110 so as to notify PCRF node 112 when service detection flow event X occurs, i.e., when traffic matching the traffic classifier contained in charging rule YY is encountered. Alternatively, the Gx rule, i.e., charging rule YY, could be sent via an XML message, a SOAP message, or a Diameter message.

After step. 3, but just prior to step 4, PCEF node 110 encounters traffic matching the traffic classifier contained in charging rule YY, i.e., service detection flow event X occurs. For example, subscriber 1 may take an action associated with the existing IP CAN session that requires transmitting or receiving traffic matching the traffic classifier contained in charging rule YY. At step 4, PCEF node 110 sends a credit control request message to PCRF node 112 notifying PCRF node 112 of the occurrence of SDF event X. The credit control request message may include information regarding the service data flow, e.g., event X details, which may be beneficial to PCRF node 112, for example, in formulating the directive part of a credit control answer message. At step 5, PCRF node 112 sends a credit control answer message to PCEF node 110 containing a new charging rule, i.e., charging rule ZZ, which may contain a directive part instructing PCEF node 110 regarding what action(s) to take with respect to the service data flow for subscriber 1. At step 6, PCRF node 112 sends a relay SDF event notification message to AF node 114 notifying AF node 114 of the occurrence of SDF event X. The relay SDF event notification message may include information regarding the service data flow, e.g., event X details, which may be beneficial to AF node 114. The relay SDF event notification message may be sent via, for example, a credit control answer message, an XML message, a SOAP message, or a Diameter message.

Figure 7:
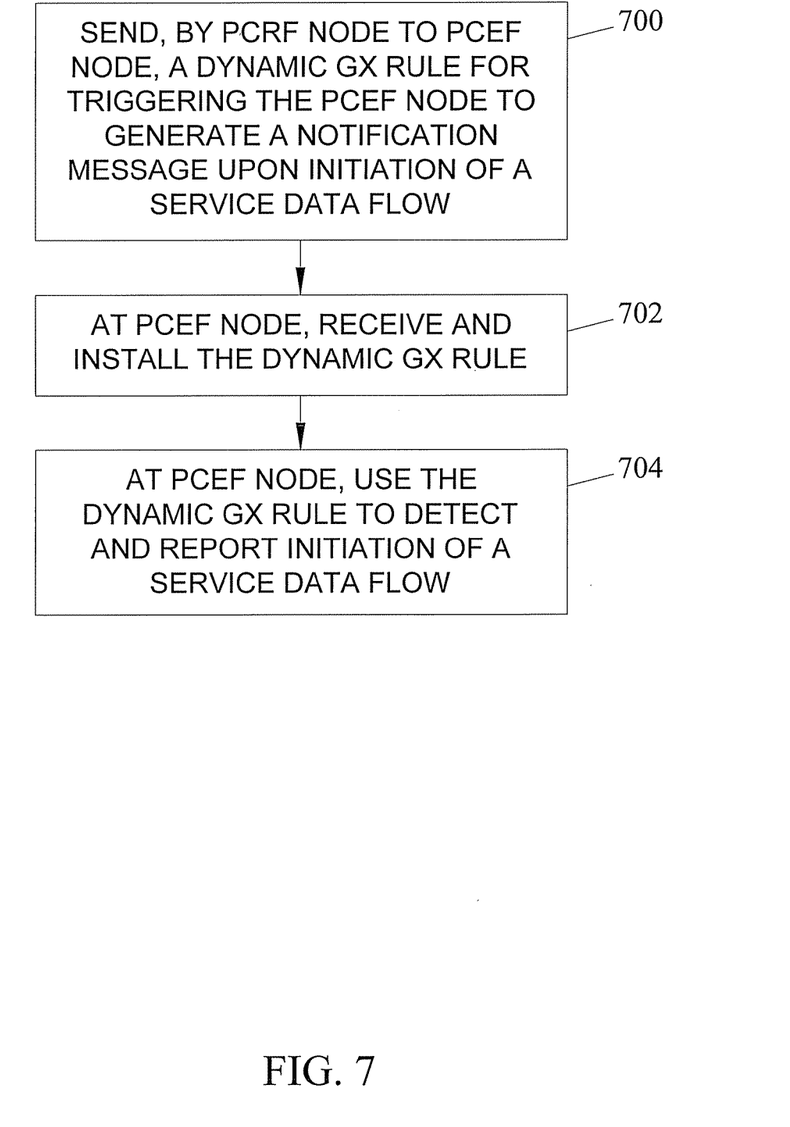
FIG. 7 is a flow chart illustrating an exemplary process for installing and using a Gx rule to detect initiation of a service data flow according to an embodiment of the subject matter described herein.

FIG. 7 is a flow chart illustrating exemplary overall steps for detecting initiation of a service data flow using a Gx rule according to an embodiment of the subject matter described herein. Referring to FIG. 7, in step 700, the PCRF node sends, to a PCEF node, a dynamic service detection rule for triggering the PCEF node to generate a notification message upon initiation of a service data flow. In step 702, the PCEF node receives and installs the Gx rule. In step 704, the PCEF node uses the Gx rule to detect and report initiation of a service data flow.

Figure 8:
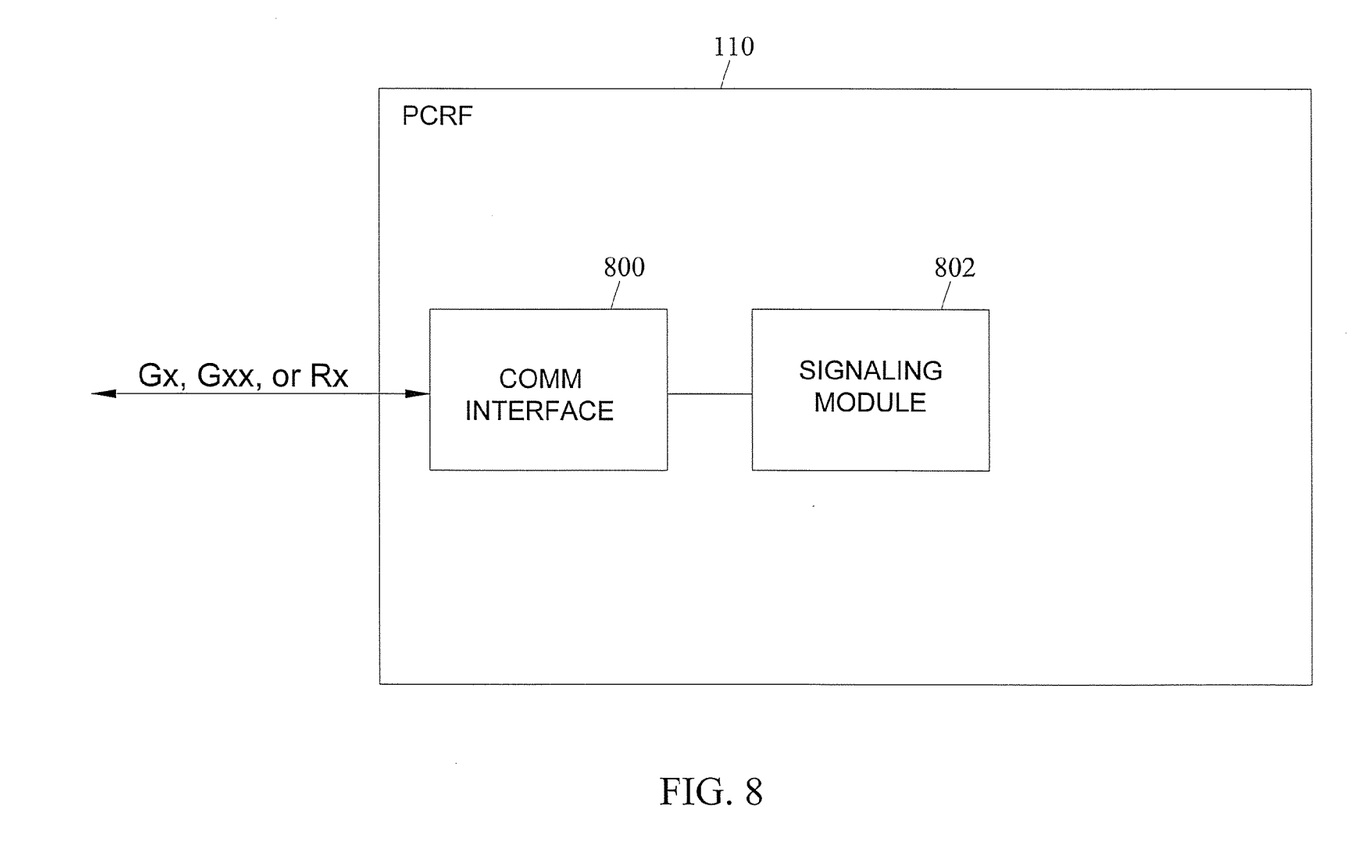
FIG. 8 is a block diagram of an exemplary PCRF node according to an embodiment of the subject matter described herein.

FIG. 8 is block diagram illustrating an exemplary PCRF node according to an embodiment of the subject matter described herein. Referring to FIG. 8, PCRF node 110 includes a communications interface 800 for sending and receiving messages. Communications interface 800 may be capable of communicating with other nodes via any suitable Diameter interface, such as a Gx interface, a Gxx interface, or an Rx interface. PCRF node 110 includes a signaling module 802 for sending, from the PCRF node to a PCEF node, a Gx rule for detecting initiation of a service data flow matching traffic classifiers specified by the rule. As set forth above, in one example, the Gx rule may contain a traffic classifier but no corresponding directive.

Figure 9:
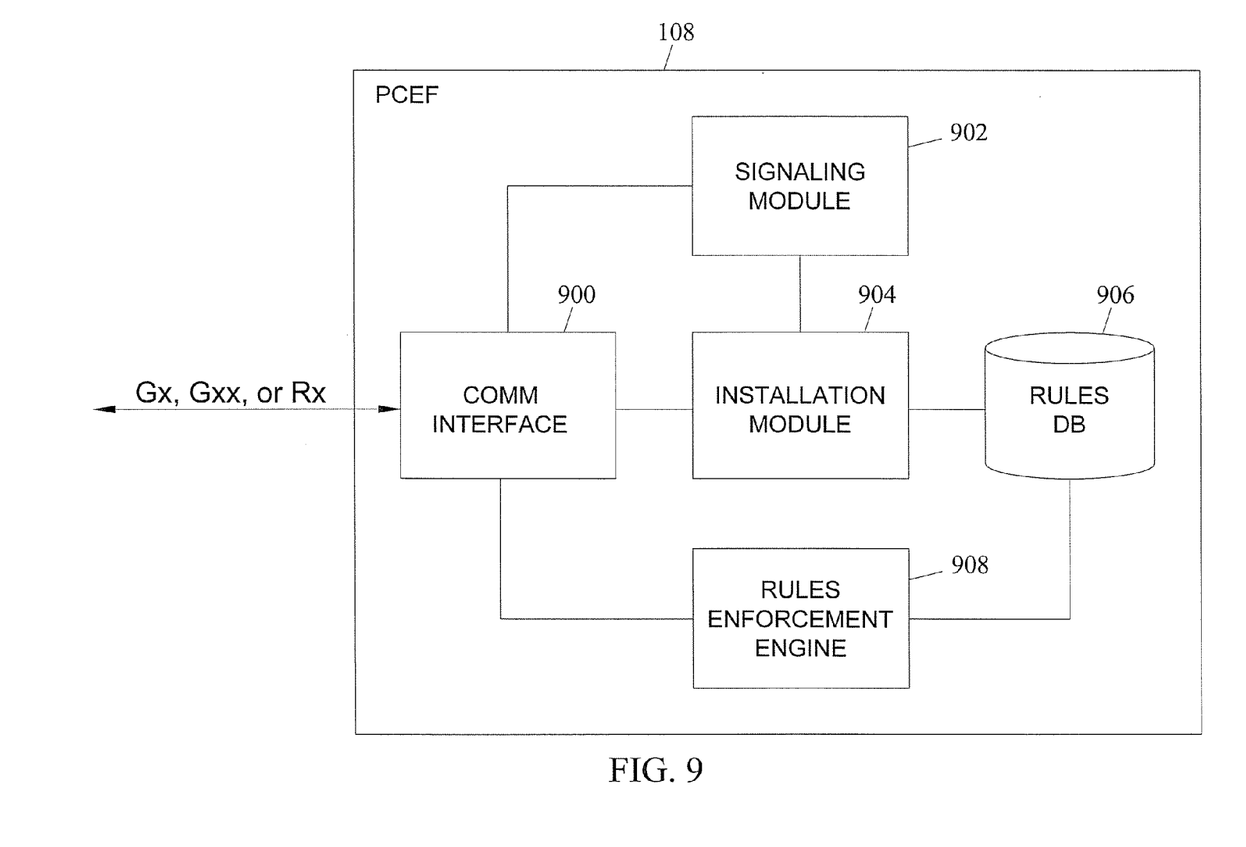
FIG. 9 is a block diagram of an exemplary PCEF node according to an embodiment of the subject matter described herein.

FIG. 9 is block diagram illustrating an exemplary PCEF node according to an embodiment of the subject matter described herein. Referring to FIG. 9, PCEF node 108 includes a communications interface 900 for sending and receiving messages. Communications interface 900 may be capable of sending and receiving messages over any suitable Diameter interface, such as a Gx interface, a Gxx interface, or an Rx interface. PCEF node 108 includes a signaling module 902 for receiving, from a PCRF node, a Gx rule for detecting initiation of a service data flow. PCEF node 108 includes an installation module 904 for installing the Gx rule in a rules database 906. PCEF node 108 further includes a rules enforcement engine 908 for executing rules stored in rules database 906. For a Gx rule for triggering notification of the initiation of a service data flow, rules enforcement engine 908 may generate and send a notification message via communications interface 900 to a particular node, such as the PCRF node or the AF node.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for detecting initiation of a service data flow using a Gx rule, the method comprising:
   sending, by a policy and charging rules function (PCRF) node to a policy and charging enforcement function (PCEF) node, a first Gx rule for triggering the PCEF node to generate a notification message upon initiation of a service data flow associated with an application that is unknown to the PCRF node when the first Gx rule is sent, wherein the first Gx rule lacks a service identifier parameter, wherein each of the PCEF node and the PCRF node includes a processor and a memory;
   receiving and installing, by the PCEF node, the first Gx rule;
   using, by the PCEF node, the first Gx rule to detect and report initiation of the service data flow associated with the application, wherein using the first Gx rule to detect and report initiation of the service data flow comprises detecting, by the PCEF node, traffic matching a traffic classifier specified by the first Gx rule and both generating and sending, by the PCEF node, the notification message reporting the initiation of the service data flow;
   receiving, by the PCRF node from the PCEF node, a notification message for reporting the initiation of the service data flow associated with the application, wherein the notification message includes information about the service data flow; and
   after receiving the notification message, sending, by the PCRF node to the PCEF node, a second Gx rule for enforcement by the PCEF, wherein the second Gx rule includes a service identifier parameter associated with the service data flow.

2. The method of claim 1 wherein using the first Gx rule to report initiation of the service data flow includes reporting the initiation of the service data flow to the PCRF node.

3. The method of claim 2 further comprising relaying, by the PCRF node, notification of the initiation of the service data flow to an application function (AF) node.

4. The method of claim 1 wherein using the first Gx rule to report initiation of the service data flow includes reporting the initiation of the service data flow to an application function (AF) node.

5. The method of claim 1 wherein the notification message comprises a Diameter message, an extensible markup language (XML) message, or a simple object access protocol (SOAP) message.

6. The method of claim 1 wherein the first Gx rule is associated with a subscriber.

7. The method of claim 1 wherein the first Gx rule is sent via a Diameter message, an extensible markup language (XML) message, or a simple object access protocol (SOAP) message.

8. The method of claim 7 wherein the first Gx rule is sent via a Diameter message and wherein the Diameter message comprises a credit control answer (CCA) message.

9. A system for detecting a service data flow using a Gx rule, the system comprising:
   a policy and charging enforcement function (PCEF) node configured to enforce policies; and
   a policy and charging rules function (PCRF) node configured to communicate with the PCEF node and to send, from the PCRF node to the PCEF node, a first Gx rule for triggering the PCEF node to generate a notification message upon initiation of a service data flow associated with an application that is unknown to the PCRF node when the Gx rule is sent, wherein the first Gx rule lacks a service identifier parameter, wherein the PCEF node receives and installs the first Gx rule and uses the first Gx rule to detect and report initiation of the service data flow associated with the application, wherein using the first Gx rule to detect and report initiation of the service data flow comprises detecting, by the PCEF node, traffic matching a traffic classifier specified by the first Gx rule and both generating and sending, by the PCEF node, the notification message reporting the initiation of the service data flow, wherein the PCRF node is configured to receive, from the PCEF node, a notification message for reporting the initiation of the service data flow associated with the application, wherein the notification message includes information about the service data flow, and after receiving the notification message, to send, to the PCEF node, a second Gx rule for enforcement by the PCEF node, wherein the second Gx rule includes a service identifier parameter associated with the service data flow, wherein each of the PCEF node and the PCRF node includes a processor and a memory.

10. The system of claim 9 wherein the PCEF node sends the notification message to the PCRF node.

11. The system of claim 10 wherein the PCRF node relays the notification message to an application function (AF) node.

12. The system of claim 9 wherein the PCEF node sends the notification message to an application function (AF) node.

13. The system of claim 9 wherein the notification message comprises a Diameter message, an extensible markup language (XML) message, or a simple object access protocol (SOAP) message.

14. The system of claim 9 wherein the first Gx rule is associated with a subscriber.

15. The system of claim 9 wherein the PCRF node is configured to send the rule via a Diameter message, an extensible markup language (XML) message, or a simple object access protocol (SOAP) message.

16. The system of claim 15 wherein the first Gx rule is sent via a Diameter message and wherein the Diameter message comprises a credit control answer (CCA) message.

17. A non-transitory computer readable medium comprising computer executable instructions that when executed by a processor of a computer perform steps comprising:
   sending, by a policy and charging rules function (PCRF) node to a policy and charging enforcement function (PCEF) node, a first Gx rule for triggering the PCEF node to generate a notification message upon initiation of a service data flow associated with an application that is unknown to the PCRF node when the Gx rule is sent, wherein the first Gx rule lacks a service identifier parameter, wherein each of the PCEF node and the PCRF node includes a processor and a memory;

receiving and installing, by the PCEF node, the first Gx rule;

using, by the PCEF node, the first Gx rule to detect and report initiation of the service data flow associated with the application, wherein using the first Gx rule to detect and report initiation of the service data flow comprises detecting, by the PCEF node, traffic matching a traffic classifier specified by the first Gx rule and both generating and sending, by the PCEF node, the notification message reporting the initiation of the service data flow;

receiving, by the PCRF node from the PCEF node, a notification message for reporting the initiation of the service data flow associated with the application, wherein the notification message includes information about the service data flow; and after receiving the notification message, sending, by the PCRF node to the PCEF node, a second Gx rule for enforcement by the PCEF, wherein the second Gx rule includes a service identifier parameter associated with the service data flow.

* * * * *